Feb. 20, 1945.  R. E. REASON  2,370,073
GAUGE HEAD FOR ELECTRICAL MEASURING APPARATUS
Filed Nov. 18, 1942  2 Sheets-Sheet 1
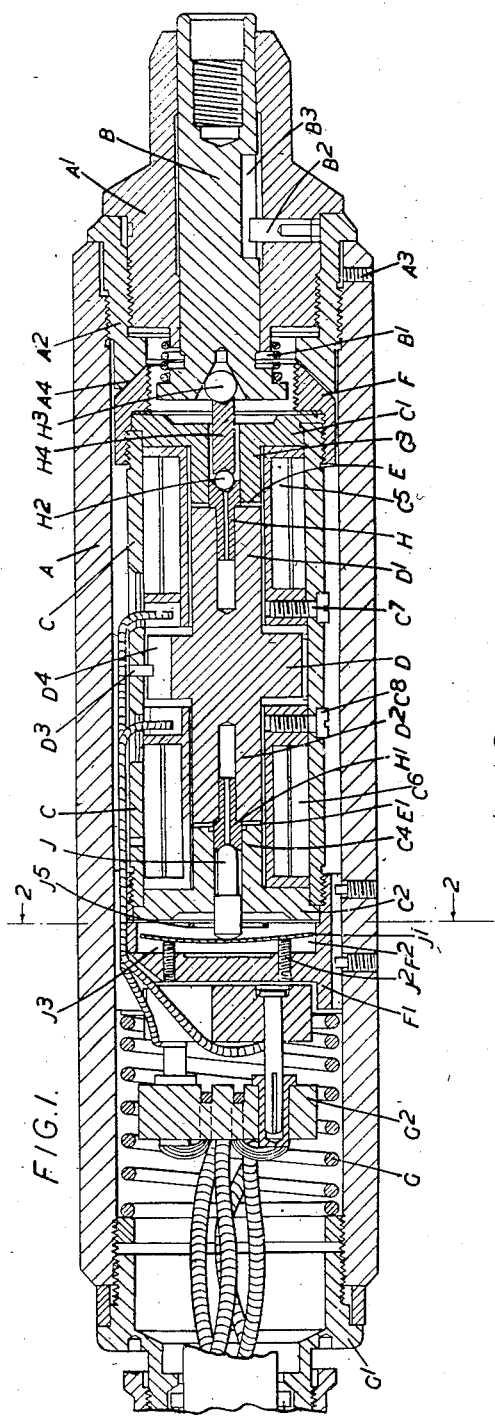
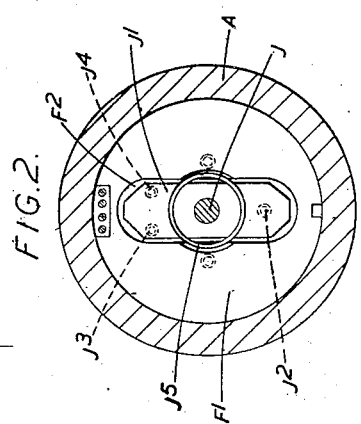
Inventor
R. E. REASON.
By
Attorneys Feb. 20, 1945.  R. E. REASON  2,370,073
GAUGE HEAD FOR ELECTRICAL MEASURING APPARATUS
Filed Nov. 18, 1942   2 Sheets-Sheet 2
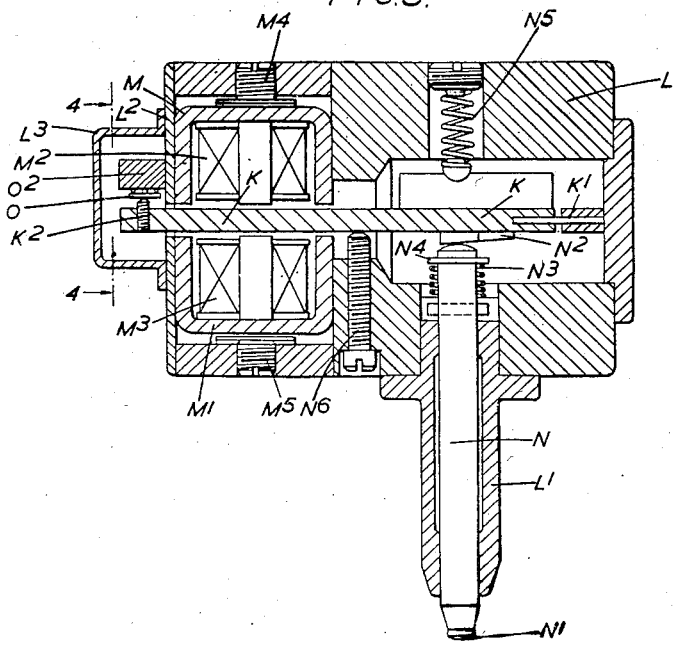
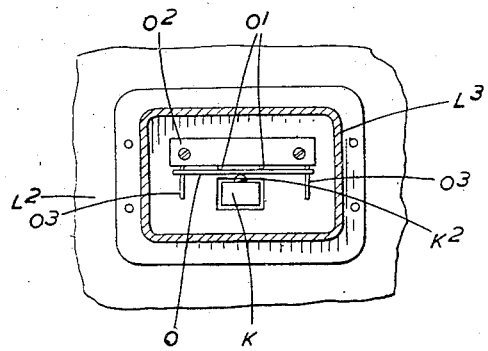
Inventor
R. E. REASON.
By
Attorneys Patented Feb. 20, 1945

2,370,073

UNITED STATES PATENT OFFICE 2,370,073

GAUGE HEAD FOR ELECTRICAL MEASURING APPARATUS

Richard Edmund Reason, Leicester, England, assignor to Kapella Limited, Leicester, England, a company of Great Britain Application November 18, 1942, Serial No. 466,088
In Great Britain April 14, 1942

10 Claims. (Cl. 33—172)

This invention relates to a gauge head for use in electrical measuring apparatus of the kind in which a plunger longitudinally movable in accordance with the quantity to be gauged operates an electromagnetic detecting device in the gauge head, such device comprising an armature (or a pair of armatures rigidly connected to one another) which moves in accordance with the plunger movement and cooperates with a pair of magnetic cores linked with windings differentially responsive to the movement of the armature to control the supply of an electrical quantity representative of the plunger movement to indicating or recording means. The gauge is particularly suitable for measuring very small quantities.

In such apparatus movement of the plunger causes an increase in the distance between the armature and one of the magnetic cores and a corresponding decrease in the distance between the armature and the other magnetic core. Since however the pull of each core on the armature varies (at short distances) approximately in accordance with the inverse square of the distance of the armature from the core, it follows that the resultant pull on the armature varies with the position of the armature. The main object of the present invention is to overcome this disadvantage of such apparatus as hitherto constructed and, in addition, to provide improved apparatus which is simple and rugged so that it is suitable both for laboratory and for workshop use.

Further objects of the invention will be apparent from the appended claims and from the following description of the accompanying drawings, in which Figure 1 is a sectional side elevation of one construction of gauge head according to the invention, Figure 2 is a section on the line 2—2 of Figure 1, Figure 3 is a sectional side elevation of an alternative construction, and Figure 4 is a section on the line 4—4 of Figure 3.

The gauge head shown in Figures 1 and 2 comprises a tubular casing A of circular cross-section, for example of metal such as steel. The casing has at one end a plug $A^1$ with an axial hole for the plunger B pressed inwardly by a spring $B^1$ and having its outer end tapped to receive a gauging tip which constitutes the detecting member for engaging the surface of the work piece to be gauged. Rotation of the plunger B is prevented and its longitudinal movement limited by a pin $B^2$ which projects into a slot $B^3$ in the plunger. The plug $A^1$ screws into a sleeve $A^2$ which in turn screws into the end of the casing A and is locked in position by a set screw $A^3$. The inner end of the sleeve $A^2$ has a conical surface $A^4$.

The electromagnet system consists of a tube or pot C of magnetic material provided with end plugs $C^1$ and $C^2$ respectively having bosses $C^3$ and $C^4$ which project inwardly into the bores of the electromagnet coils $C^5$ and $C^6$ which are of lengths such that their inside ends are spaced apart. A central member has a mid-portion D in the space within the pot C between the two inner ends of the coils $C^5$ and $C^6$. The two ends $D^1$ and $D^2$ of this member are of smaller diameter than the midportion D so as to project into the bores of the coils $C^5$ and $C^6$ towards the bosses $C^3$ and $C^4$, the ends of the parts $D^1$ and $D^2$ being spaced from the bosses by air gaps E and $E^1$ respectively. The member D, $D^1$, $D^2$ constitutes the "armature" of the detecting device and is free to move longitudinally but is prevented from rotation by a pin $D^3$ which projects into a longitudinal slot $D^4$. The arrangement thus comprises two electromagnets with a common armature, so arranged that it forms part of the magnetic circuit of each electromagnet and longitudinal movement thereof increases the reluctance of one magnetic circuit by increasing its airgap E or $E^1$ and decreases the reluctance of the other magnetic circuit by a corresponding decrease in its airgap $E^1$ or E. The two magnetic systems are thus differentially responsive to movements of the armature.

The coils $C^5$ and $C^6$ are fixed within the pot C by means of rings at the inner ends of their bobbins and set screws $C^7$ and $C^8$ passing through the pot, the outer ends of the bobbins bearing against the end plugs $C^1$ and $C^2$. These plugs are firmly held in the ends of the pot by end caps F and $F^1$ which screw on to the outside of the pot.

The cap F has a bearing surface (preferably spherical) which cooperates with the conical bearing surface $A^4$ on the sleeve $A^2$ when the complete electromagnet system is pressed towards the end plug $A^1$ by means of a compression spring G provided in the casing between the outer end of the cap $F^1$ and the inner surface of a cable grip $G^1$ which closes the end of the casing remote from the detecting member. The supply cables to the electromagnet coils pass through the grip $G^1$ to a terminal block $G^2$ from which insulated conductors are led through suitable ducts to the coils $C^5$ and $C^6$.

The ends D and $D^1$ of the armature have axial holes bored therein to receive short headed plugs H and $H^1$ of non-magnetic material such as brass. The plug H at the detecting member end has a head with a socket for a ball $H^2$. The inner end of the plunger B also has a socket for a ball $H^3$ and between the two balls is a short distance piece $H^4$. As the plunger B is pressed inwardly by the spring $B^1$ and the electromagnet system is pressed towards the plunger by the spring G, continuous contact is maintained from the plunger B through the ball $H^3$, the distance piece $H^4$, the ball $H^2$ and the plug H, to the armature D, $D^1$, $D^2$ which thus moves in accordance with movements of the plunger, that is with the gauging tip in contact with the work piece. It will be noted that in the event of undue pressure being exerted on the gauging tip the complete electromagnet system and the stylus can move upwardly against the pressure of the spring G until the gauging tip is wholly within the bore in the end plug $A^1$ and is thus protected from shock.

The plug $H^1$ in the other end $D^1$ of the armature is used to transmit the force of the spring provided, in accordance with the present invention, to provide the working pressure and also to compensate for the additional force exerted by the electromagnets on the armature D, $D^1$, $D^2$, when it moves from the central position in which the air gaps E and $E^1$ are equal, as hereinafter described. Accordingly the end plug $C^2$ is axially bored to receive a plunger J the inner end of which is pressed on to the head of the plug $H^1$ by a leaf spring $J^1$ mounted in a slot $F^2$ in the inner surface of the end cap $F^1$. The spring $J^1$ is supported and its pressure adjusted by three grub screws $J^2$, $J^3$, $J^4$ (Figure 2) which are screwed through tapped holes in the cap $F^1$. The spring is retained in the slot $F^2$ by a ring $J^5$ which snaps into grooves in the opposite side walls of the slot.

In a gauge of the type shown in Figures 1 and 2 which is mainly intended for measuring very small differences in dimensions, the airgaps are small and the pressure due to the electromagnets will change very considerably for very small movements of the armature. Thus for instance the pressure due to the electromagnets may change by ¼ lb. for a movement of the armature of a thousandths of an inch. It is accordingly necessary for the controlling spring $J^1$ to be so selected as to have a very high pressure gradient which should, as nearly as is possible, be equal to that of the electromagnets. In addition the spring must be so mounted that the pressure it exerts on the plunger J can be adjusted within very fine limits, this being obtained in the construction described above by means of the screws $J^2$, $J^3$, $J^4$, which, it is found in practice, are sensitive to about one-eighth of a turn.

The manner in which the forces due to the springs $J^1$ and $B^1$ cooperate to give the desired compensation for the electromagnet forces and to provide the working pressure can perhaps best be described in the following manner.

In the first place, if neither of the springs were provided, the resultant force on the armature would be that due to the electromagnets alone. In the outermost position of the armature (that is the position furthest towards the right in Figure 1 at the outer end of the working range of the armature movement when the gap E is nearly closed) the force due to the electromagnets would be an outward force equal to the difference between two inverse squares. Provided that the working range is limited to a part only of the possible movement, the total force due to the two electromagnets will follow a linear law within a fairly close degree of approximation from a positive value on one side of the central position to a negative value on the other side. Such approximately linear pressure gradient can therefore be substantially balanced by the pressure gradient of the spring $J^1$, if appropriately dimensioned, provided that the position of zero force of such spring lies outside the working range of the armature. For example, if the spring $J^1$ is arranged to exert zero force on the armature in the outermost position thereof and if its pressure gradient is made as nearly as possible equal to that of the total electromagnet force, the resultant force on the armature will remain substantially constant throughout the working range on both sides of the central position and will be equal to the outward force exerted by the electromagnets alone in the outermost position. If such resultant force happens to be of a magnitude corresponding to the desired working pressure, the spring $B^1$ could be omitted altogether, and the arrangement would give an approximately uniform working pressure throughout the range. Usually however such electromagnet force will be rather too great for the working pressure, and the spring $B^1$ is therefore provided to reduce the resultant force on the armature to the desired value, the spring $B^1$ having its position of zero force so far outside the limits of the working range that its force may be taken as approximately constant throughout such range.

It should be made clear that the error due to the assumption of linearity of the pressure gradient of the electromagnets can be kept very small. In practice the spring $J^1$ is so dimensioned and adjusted as to give exact compensation (allowing with the spring $B^1$ for the desired working pressure) at three points, namely the central position and two positions on either side thereof at or near the limits of the working range, and the slight errors in all other positions can then be made so small that, in the case of the gauge, they can be ignored whilst still permitting the desired high degree of precision in the measurement.

Figures 3 and 4 show a form of gauge in which an armature K is pivoted, by means of a ligament spring $K^1$, within a casing L so that it lies between the poles of a pair of E-shaped magnetic cores M and $M^1$ and the airgaps between the armature and the cores are varied differentially as the armature moves about its pivot. A plunger N is slidable longitudinally in a tube $L^1$ fixed to or forming part of the casing so that the plunger is substantially perpendicular to the armature, the outer end of the plunger (which projects beyond the tube $L^1$) carrying a diamond or other hard tip $N^1$ to engage the test piece whilst its inner end is rounded and pressed against the armature K. An adjustable wedge $N^2$ is preferably disposed between the head of the plunger and the armature for zero adjustment purposes. The plunger N is pressed upwardly into contact with the armature by a helical spring $N^3$ wound around the plunger and having as its abutments, a fixed collar $N^4$ on the plunger and the end of the tube surrounding the plunger respectively. The armature is pressed downwardly on to the head of the plunger by a second spring N⁵ which is adjustable for setting to a predetermined value the pressure of the detecting member on the test piece. A stop screw N⁶ is provided to prevent the armature from being pressed by the spring N⁵ on to the lower magnetic core M¹, this screw usually being set so that the armature when it rests against the upper end of the screw, is in its zero position mid-way between the cores.

In order, in accordance with this invention, substantially to compensate for the forces exerted on the armature by the magnetic cores in all positions of the armature, the end of the armature K remote from the pivot K¹ is arranged to extend through an aperture in the end wall L² of the casing L and to be acted on by a leaf spring. Thus an adjustable stud K² projecting upwardly through the armature has its end pressing against the centre of the underside of a leaf spring O so that the upper surface of the spring is pressed against four studs O¹ on the undersurface of a block O² fixed to the end plate L². The studs O¹ are disposed, as shown in Figures 3 and 4 substantially at the corners of a rectangle so that the spring tends to flex about the studs as the centre is pressed upwardly due to upward movement of the armature. Two downwardly projecting guide rods O³ passing freely through holes near the ends of the spring serve to retain the spring. By setting the stud K²—the adjustment of which is very sensitive—the pressure of the spring O can be adjusted so as substantially to compensate for the force exerted by the magnetic cores M and M¹ throughout the normal operating range of the instrument. The projecting end of the armature K and the spring O are protected by a cover L³ which is readily removable to permit adjustment of the stud K².

In this arrangement the cores M and M¹ are provided with choking coils M² and M³ wound on their centre limbs, changes in the relative impedances of the coils preferably being measured by connecting them in the ratio arms of a Wheatstone bridge. The magnification of the instrument can be varied by individual adjustment of the positions of the cores relatively to the armature by means of the screws M⁴ and M⁵ but, if desired, the cores may be mounted on a common supporting frame which is movable relatively to the armature to provide backing off adjustment.

In setting the controlling spring in arrangements according to the invention, the spring is generally adjusted so as to provide over the range of operation the desired substantially constant operating pressure and not to reduce the pressure completely to zero. If the spring is first set so as to provide exact balance, a small additional force must be provided to give the working pressure, this force being provided most conveniently by the spring used for balancing.

It is to be understood that the above description is by way of example only and that details of the constructions described may be varied within the scope of the invention.

What I claim as my invention and desire to secure by Letters Patent is:

1. A gauge head for use in electrical measuring apparatus, comprising a casing, a plunger longitudinally movable relatively to the casing in accordance with the quantity to be gauged, an armature movable in accordance with the plunger movement, a pair of magnetic cores mounted in the casing and cooperating with the armature, windings linked with the cores so as to be differentially responsive to the movement of the armature, a leaf spring, at least three pins carried by the casing and engaging with one side of the leaf spring in the neighbourhood of its ends to give multi-point support for the spring, a member carried by the armature and engaging with the other side of the leaf spring at an intermediate point, and means for adjusting the force exerted on the armature by the leaf spring, the leaf spring being so dimensioned and adjusted that the resultant force on the armature is approximately constant throughout the working range of movement of the armature, the armature and the cores and windings together constituting an electro-magnetic detecting device controlling the supply of an electrical quantity for giving the desired measuring indication.

2. A gauge head for use in electrical measuring apparatus, comprising a casing, a pair of magnetic cores each in the form of a pot within the casing, a movable armature at least part of which lies within the cores, coaxially mounted coils surrounding the armature within the cores and differentially responsive to the armature movement a plunger movable relatively to the casing in accordance with the quantity to be gauged in a direction substantially parallel to the common axis of the coils and acting on one end of the armature, a leaf spring, more than two pins carried by the casing and engaging with one side of the leaf spring in the neighbourhood of its ends to give multi-point support for the spring, a member carried by the armature and engaging with the other side of the leaf spring at an intermediate point, the leaf spring being so dimensioned and adjusted that the resultant force on the armature is approximately constant throughout the working range of movement of the plunger and armature, the armature and the cores and coils together constituting an electromagnetic detecting device controlling the supply of an electrical quantity for giving the desired measuring indications.

3. A gauge head for use in electrical measuring apparatus, comprising a casing, a plunger longitudinally movable relatively to the casing in accordance with the quantity to be gauged, an armature movable in accordance with the plunger movement, a pair of magnetic cores mounted in the casing and cooperating with the armature, windings linked with the cores so as to be differentially responsive to the movement of the armature, a leaf spring, more than two pins carried by the casing and engaging with one side of the leaf spring in the neighborhood of its ends to give multiple point support for the spring, a member carried by the armature and engaging with the other side of the leaf spring at an intermediate point, the leaf spring being so dimensioned and adjusted that the resultant force on the armature is approximately constant throughout the working range of movement of the armature, the armature and the cores and windings together constituting an electro-magnetic detecting device controlling the supply of an electrical quantity for giving the desired measuring indication.

4. The combination with the features as claimed in claim 3 wherein said member is screw-threaded to the armature bearing against the controlling spring for adjusting the force exerted by the controlling spring on the armature.

5. The combination with the features as claimed in claim 3 wherein said casing has an end cap to which said pins are screw-threaded for adjusting the force exerted by the controlling spring on the armature.

6. A gauge head for use in electrical measuring apparatus comprising a casing, a plunger longitudinally movable relatively to the casing in accordance with the quantity to be gauged, an armature movable in accordance with the plunger movement, a pair of magnetic cores mounted in the casing and cooperating with the armature, windings linked with the cores so as to be differentially responsive to the movement of the armature, and means whereby the resultant force on the armature is maintained approximately constant throughout the working range of movement of the armature, such means comprising at least one appropriately dimensioned controlling leaf spring, the armature and the cores and windings together constituting an electromagnetic detecting device controlling the supply of an electrical quantity for giving the desired measuring indication, and means for adjusting the force exerted on the armature by the controlling leaf spring.

7. A gauge head for use in electrical measuring apparatus, comprising a casing, a pair of magnetic cores each in the form of a pot within the casing, a movable armature at least part of which lies within the cores, coaxially mounted coils surrounding the armature within the cores and differentially responsive to the armature movement, a plunger movable relatively to the casing in accordance with the quantity to be gauged in a direction substantially parallel to the common axis of the coils and acting on one end of the armature, and a controlling spring acting on the other end of the armature and so dimensioned that the resultant force on the armature is approximately constant throughout the working range of movement of the plunger and armature, the armature and the cores and coils together constituting an electromagnetic detecting device controlling the supply of an electrical quantity for giving the desired measuring indication, and means for adjusting the force exerted on the armature by the controlling spring.

8. A gauge head for use in electrical measuring apparatus comprising a casing, a plunger longitudinally movable relatively to the casing in accordance with the quantity to be gauged, an armature movable in accordance with the plunger movement, a pair of magnetic cores mounted in the casing and cooperating with the armature, windings linked with the cores so as to be differentially responsive to the movement of the armature, and means whereby the resultant force on the armature is maintained approximately constant throughout the working range of movement of the armature, such means comprising at least one appropriately dimensioned controlling leaf spring, the armature and the cores and windings together constituting an electromagnetic detecting device controlling the supply of an electrical quantity for giving the desired measuring indication, in which the said armature is pivotally mounted in the casing, the pivot being constituted by a ligament spring which also acts at least in part as a controlling spring.

9. A gauge head for use in electrical measuring apparatus comprising a casing, a plunger longitudinally movable relatively to the casing in accordance with the quantity to be gauged, an armature movable in accordance with the plunger movement, a pair of magnetic cores mounted in the casing and cooperating with the armature windings linked with the cores so as to be differentially responsive to the movement of the armature, and means whereby the resultant force on the armature is maintained approximately constant throughout the working range of movement of the armature, such means comprising at least one appropriately dimensioned controlling leaf spring, the armature and the cores and windings together constituting an electromagnetic detecting device controlling the supply of an electrical quantity for giving the desired measuring indication, and means for individually adjusting the magnetic cores relatively to the armature.

10. A gauge head for use in electrical measuring apparatus comprising a casing, a plunger longitudinally movable relatively to the casing in accordance with the quantity to be gauged, an armature movable in accordance with the plunger movement, a pair of magnetic cores mounted in the casing and cooperating with the armature, windings linked with the cores so as to be differentially responsive to the movement of the armature, and means whereby the resultant force on the armature is maintained approximately constant throughout the working range of movement of the armature, such means comprising at least one appropriately dimensioned controlling leaf spring, the armature and the cores and windings together constituting an electromagnetic detecting device controlling the supply of an electrical quantity for giving the desired measuring indication, and a ligament spring carried by the casing and constituting a pivot for the armature, means for adjusting the magnetic cores relatively to the casing, and means for adjusting the force exerted by the controlling spring on the armature.

RICHARD EDMUND REASON.